US009683298B2

(12) United States Patent
Anagnostopoulos

(10) Patent No.: US 9,683,298 B2
(45) Date of Patent: Jun. 20, 2017

(54) METHOD AND APPARATUS FOR PRODUCING GAS

(71) Applicant: Hydrox Holdings Limited, Pretoria (ZA)

(72) Inventor: George Anagnostopoulos, Krugersdorp (ZA)

(73) Assignee: Hydrox Holdings Limited, Pretoria (ZA)

( * ) Notice: Subject to any disclaimer, the term of this patent is extended or adjusted under 35 U.S.C. 154(b) by 269 days.

(21) Appl. No.: 14/377,948

(22) PCT Filed: Feb. 11, 2013

(86) PCT No.: PCT/IB2013/051109
§ 371 (c)(1),
(2) Date: Aug. 11, 2014

(87) PCT Pub. No.: WO2013/118104
PCT Pub. Date: Aug. 15, 2013

(65) Prior Publication Data
US 2015/0034493 A1     Feb. 5, 2015

(30) Foreign Application Priority Data

Feb. 10, 2012 (ZA) .................................. 2012/00696

(51) Int. Cl.
*C25B 9/06*     (2006.01)
*C25B 1/06*     (2006.01)
(Continued)

(52) U.S. Cl.
CPC .................. *C25B 1/02* (2013.01); *C25B 1/06* (2013.01); *C25B 9/04* (2013.01); *C25B 9/06* (2013.01);
(Continued)

(58) Field of Classification Search
CPC ................................... C25B 9/06; C25B 1/06
See application file for complete search history.

(56) References Cited

U.S. PATENT DOCUMENTS

| 4,048,383 A | 9/1977 | Clifford |
| 5,105,773 A * | 4/1992 | Cunningham ............ C25B 1/02 123/1 A |

(Continued)

FOREIGN PATENT DOCUMENTS

| CA | 2 804 880 | 1/2012 |
| CN | 1231348 A | 10/1999 |

(Continued)

OTHER PUBLICATIONS

International Search Report for PCT/IB2013/051109. date of mailing Jun. 5, 2013.

(Continued)

*Primary Examiner* — Nicholas A Smith
(74) *Attorney, Agent, or Firm* — Blank Rome LLP

(57) ABSTRACT

This invention relates to electrolysis apparatus 10 adapted to produce oxygenated and hydrogenated fluid, formed during the electrolysis of an electrolytic solution passed into the apparatus 10. The apparatus 10 comprises a first and second outer end members 12 and 14 and first and second permeable electrodes 16 and 18 spaced from one another. Each permeable electrode 16 and 18 are of a foraminous or perforated material. An inlet chamber 20 has two inlets 26 for allowing electrolytic solution to pass into said chamber 20. The apparatus 10 also has an oxygen outlet 28 as well as a hydrogen outlet 30. The flow of electrolytic solution through the permeable electrodes 16 and 18 will carry with it the oxygen and hydrogen gasses generated on the positive and negative (first and second) permeable electrodes respectively.

20 Claims, 3 Drawing Sheets

(51) Int. Cl.
*C25B 11/03* (2006.01)
*C25B 1/02* (2006.01)
*C25B 9/04* (2006.01)
*C25B 9/18* (2006.01)
*C25B 11/04* (2006.01)

(52) U.S. Cl.
CPC .............. *C25B 9/18* (2013.01); *C25B 11/035* (2013.01); *C25B 11/04* (2013.01); *Y02E 60/366* (2013.01)

(56) References Cited

U.S. PATENT DOCUMENTS

| | | | |
|---|---|---|---|
| 5,711,865 A * | 1/1998 | Caesar | C25B 1/04 204/228.2 |
| 2006/0060464 A1 | 3/2006 | Chang | |
| 2007/0251830 A1* | 11/2007 | Conrad | C25B 1/02 205/508 |
| 2009/0152118 A1 | 6/2009 | Sugimasa et al. | |
| 2010/0012503 A1* | 1/2010 | Hinatsu | C25B 1/00 205/628 |
| 2012/0012468 A1* | 1/2012 | Anagnostopoulos | C25B 1/10 205/615 |

FOREIGN PATENT DOCUMENTS

| | | |
|---|---|---|
| CN | 1505698 A | 6/2004 |
| DE | 2 159 246 A1 | 6/1973 |
| DE | 2159246 | 6/1973 |
| EP | 1 398 395 | 3/2004 |
| EP | 1 398 395 A1 | 3/2004 |
| JP | 04-284889 A | 10/1992 |
| JP | 08-015598 B | 2/1996 |
| JP | 2004-188398 | 7/2004 |
| JP | 2005536639 A | 12/2005 |
| JP | 2009144214 A | 7/2009 |
| JP | 2013531134 A | 8/2013 |
| WO | WO-2012/004769 A1 | 1/2012 |
| WO | WO 2012/004769 A1 | 1/2012 |

OTHER PUBLICATIONS

Written Opinion of the International Preliminary Examining Authority for PCT/IB2013/051109, date of mailing Feb. 6, 2014.
Notification of Transmittal of the International Preliminary Report on Patentability for PCT/IB2013/051109, date of mailing May 13, 2014.

* cited by examiner

METHOD AND APPARATUS FOR PRODUCING GAS

FIELD OF THE INVENTION

This invention relates to a method and apparatus for producing gas. More particularly, but not exclusively, this invention relates to an electrolysis cell and method in which combustible gasses, such as hydrogen gas and oxygen gas are produced through the electrolysis of an aqueous electrolytic solution and are kept separate upon production.

BACKGROUND TO THE INVENTION

An electrolysis cell uses electricity to convert water to hydrogen and oxygen in gas phase.

Known electrolysis cells consist of either: a liquid alkaline electrolyser which utilizes a porous membrane between the electrodes to separate the hydrogen and oxygen gases or a polymer electrolyte electrolyser which utilizes a proton exchange membrane in order to separate the hydrogen and oxygen gases produced through the electrolysis process. The electrolysis cell further includes an anode positioned along a first face of the proton exchange membrane and a cathode positioned along a second opposite face of the proton exchange membrane.

Known membranes in liquid alkaline electrolysers are generally made from porous plastics whilst in polymer electrode electrolysers the known proton exchange membranes are semi-permeable membranes generally made from ionomers and designed to conduct protons while being impermeable to gases, such as oxygen and hydrogen. Proton exchange membranes can be made from either pure polymer membranes or from composite membranes where other materials are embedded in a polymer matrix.

A first disadvantage of all types of membranes is the current flow restriction brought about it.

A further disadvantage brought about by the membranes is the increase in distance between the electrodes which results in increased resistance A further disadvantage of the known Liquid Alkaline Membranes is the decrease of efficiency with an increase in current density. The efficiency of the known proton exchange membranes goes down as the voltage applied across the cell goes up, due to poor gas removal from the membrane. Also, the electrodes cannot be stacked too close together, as this will inhibit gas removal.

A further disadvantage of the known Liquid Alkaline Membranes is its inability to function effectively under high temperatures and high pressure.

A further disadvantage of the known proton exchange membrane is the high cost of the membrane, since it requires that a noble-metal catalyst (typically platinum) be used to separate the hydrogen's electrons and protons. The platinum catalyst is also extremely sensitive to carbon monoxide poisoning, making it necessary to employ an additional reactor to reduce carbon monoxide in the fuel gas if the hydrogen is derived from an alcohol or hydrocarbon fuel. This again adds to the cost of using the known proton exchange membrane.

Further disadvantages of the know proton exchange membranes are their poor conductivity at lower relative humidity and their poor mechanical properties at temperatures above approximately 100° C. The operating temperature of these membranes is relatively low and temperatures near 100° C. are not high enough to perform useful cogeneration.

Prior art document PCT/IB2011/053050 in the name of HYDROX HOLDINGS LIMITED entitled "Method and apparatus for producing gas", describes the use of a liquid alkaline electrolyser employing a hydrodynamic barrier instead of a porous or proton exchange membrane to achieve electrolysis. This invention results in a huge improvement in terms of manufacturing and operating costs and size.

In this specification, the term "combustible fluid" includes within its scope combustible gas containing predominantly hydrogen and/or oxygen in gas phase.

OBJECT OF THE INVENTION

It is accordingly an object of the present invention to provide a method and apparatus for producing gas, with which the above disadvantages may be overcome and which are useful alternatives to known electrolysis cells and methods for producing gas.

SUMMARY OF THE INVENTION

According to a first aspect of the invention there is provided a method for producing combustible fluid from a liquid alkaline electrolytic solution during a process of electrolysis including the steps of:
providing an electrolytic solution;
providing an electrolysing apparatus having first and second spaced apart permeable electrodes, immersed in a chamber having at least one inlet and two outlets;
passing the solution into the chamber via the inlet; and
applying a voltage to the apparatus across the electrodes to electrolyse the solution between the electrodes so that a first combustible fluid forms on the first electrode and a second combustible fluid forms on the second electrode, and the first combustible fluid passes from the first electrode and into the first outlet and the second combustible fluid passes from the second electrode and into the second outlet, and wherein the first and second electrodes may be provided in relative close proximity to one another in a range of between 1 mm and 6 mm.

The electrolytic solution may be potassium hydroxide (KOH) or sodium hydroxide (NaOH).

The combustible fluid may be hydrogenated and oxygenated fluid and more specifically the combustible fluid may be hydrogen and oxygen gas.

The permeable electrodes may each be perforated or foraminous.

Each permeable electrode may further be of a mesh or foam material.

Each permeable electrode may be made of a material selected from the group including stainless steel, nickel, palladium, cobalt or platinum material.

The first and second electrodes may be substantially parallel.

The first and second permeable electrodes may have a correct and predetermined ratio of open to closed area also known as the PPI (pores per square inch), which may be influenced by the size of the outlets and the pressure with which the solution is provided to the apparatus.

The first and second permeable electrodes may be one set of permeable electrodes and the apparatus may include a plurality of sets of permeable electrodes, all having a similar configuration.

The electrolysing apparatus may define at least one inlet in fluid flow communication with all of the inlets and the method may include the step of passing the solution to the chambers of all of the sets of permeable electrodes via an inlet manifold.

The first combustible fluid outlet passage may be in fluid flow communication with all of the first combustible fluid outlets of all of the sets of permeable electrodes and the second combustible fluid outlet passage may be in fluid flow communication with all of the second combustible fluid outlets of all of the sets of permeable electrodes, the arrangement being such that the first combustible fluid formed on the first electrode passes out of the apparatus via the first combustible fluid outlet and the second combustible fluid formed on the second electrode passes out of the apparatus via the second combustible fluid outlet.

According to a second aspect of the invention there is provided an electrolysing apparatus in which combustible fluid is produced from an electrolytic solution, namely potassium hydroxide (KOH) or sodium hydroxide (NaOH) in a process of liquid alkaline electrolysis comprising:
  first and second spaced apart permeable electrodes immersed in an inlet chamber;
  at least one inlet into the inlet chamber for passing the electrolytic solution into said inlet chamber; and
  a first and second combustible fluid outlets;
the arrangement being such that the electrolytic solution passes into the inlet chamber via the inlet where electrolysis takes place; and such that a first combustible fluid forms on the first electrode; and such that a second combustible fluid forms on the second electrode; and further such that the first combustible fluid passes from the first electrode into the first combustible fluid outlet; and the second combustible fluid passes from the second electrode into the second combustible fluid outlet, and wherein the first and second electrodes may be provided in relative close proximity to one another in a range of between 1 mm and 6 mm.

The electrolyte may be potassium hydroxide (KOH) or sodium hydroxide (NaOH) at concentrations ranging from 20% to 50%.

The combustible fluid may be hydrogenated and oxygenated fluid and more specifically the combustible fluid may be hydrogen and oxygen gas.

The permeable electrodes may each be perforated or foraminous.

Each permeable electrode may further be of a mesh or foam material.

Each permeable electrode may be made of a material selected from the group including stainless steel, nickel, palladium, cobalt or platinum material.

The first and second electrodes may be substantially parallel.

The first and second electrodes may each include at least one connector tab for connecting to a power supply to supply a voltage over the electrolysing apparatus to electrolyse the electrolytic solution.

The first and second electrodes may be attached to stainless steel couplers, fixed to the connector tab for distribution of current around the electrodes.

A PVC sleeve keeps each of the electrodes firmly attached to the coupler, and electrically isolates the coupler from the electrolyte.

The first and second permeable electrodes may have a correct and predetermined ratio of open to closed area (or PPI), which may be influenced by the size of the outlets and the pressure with which the solution is provided to the apparatus.

The apparatus may include first and second outer end members, each being of polyethylene.

The apparatus may be cylindrical, square or multi-agonal in shape.

The apparatus may include circulating means, such as a pump, to circulate the solution through the apparatus and to force the solution into the inlet chamber.

The apparatus may include a first combustible fluid collection container connected to the first combustible fluid outlet and a second combustible fluid collection container connected to the second combustible fluid outlet.

BRIEF DESCRIPTION OF THE DRAWINGS

The invention will now be described further by way of non-limiting examples with reference to the accompanying drawings wherein.

DESCRIPTION OF PREFERRED EMBODIMENTS OF THE INVENTION

Figure 1:
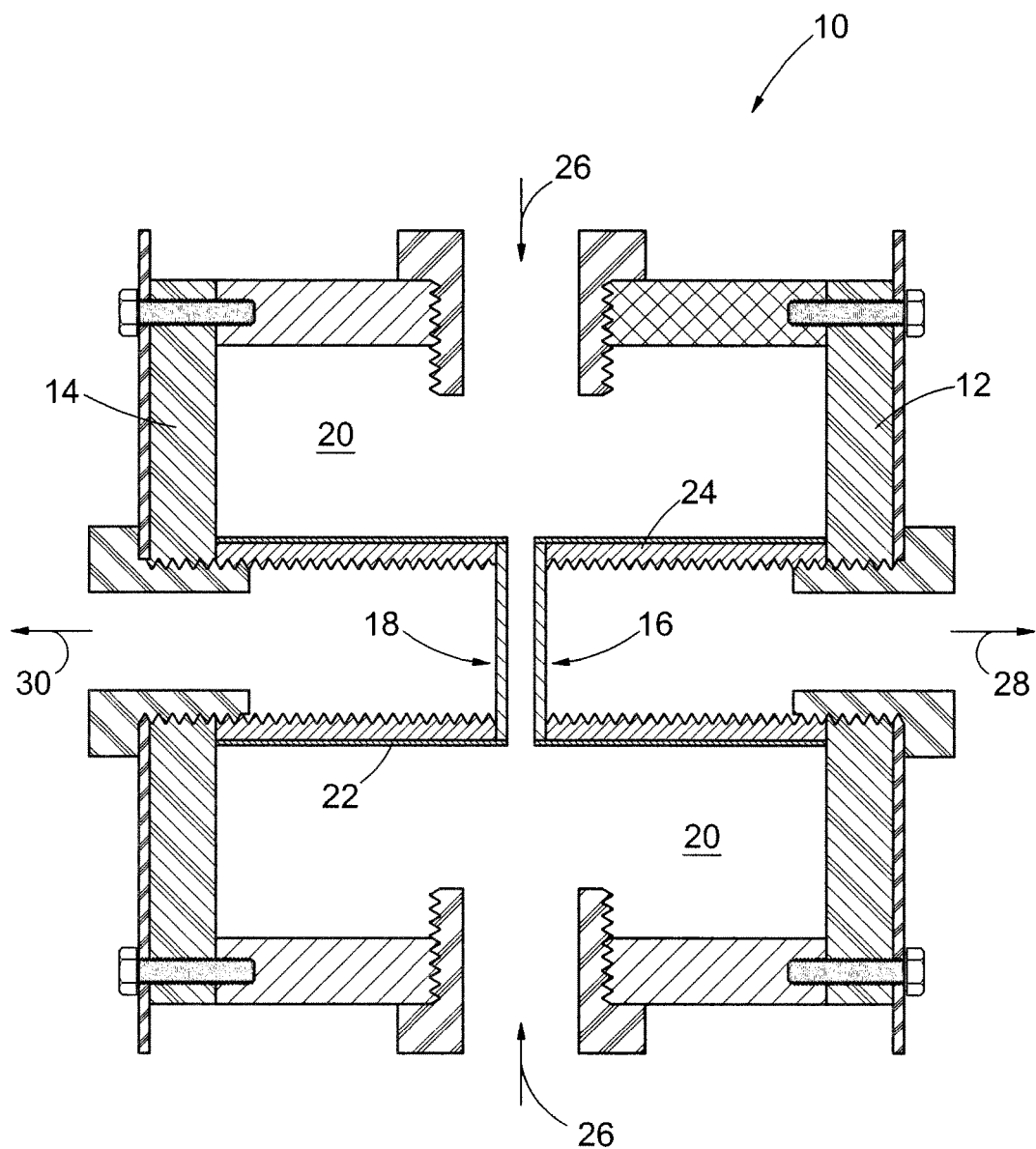
FIG. 1 is a cross sectional view of an electrolysis apparatus according to a first preferred embodiment of the invention.

Referring to the drawings, an electrolysis apparatus according to a preferred embodiment of the invention is generally designated by reference numeral 10.

The electrolysis apparatus 10 is adapted to produce oxygenated and hydrogenated fluid, formed during the electrolysis of an electrolytic solution passed into the apparatus 10.

The apparatus 10 comprises a first outer end member 12, being of polyethylene, and a second outer end member 14, also being of polyethylene.

Figure 2:
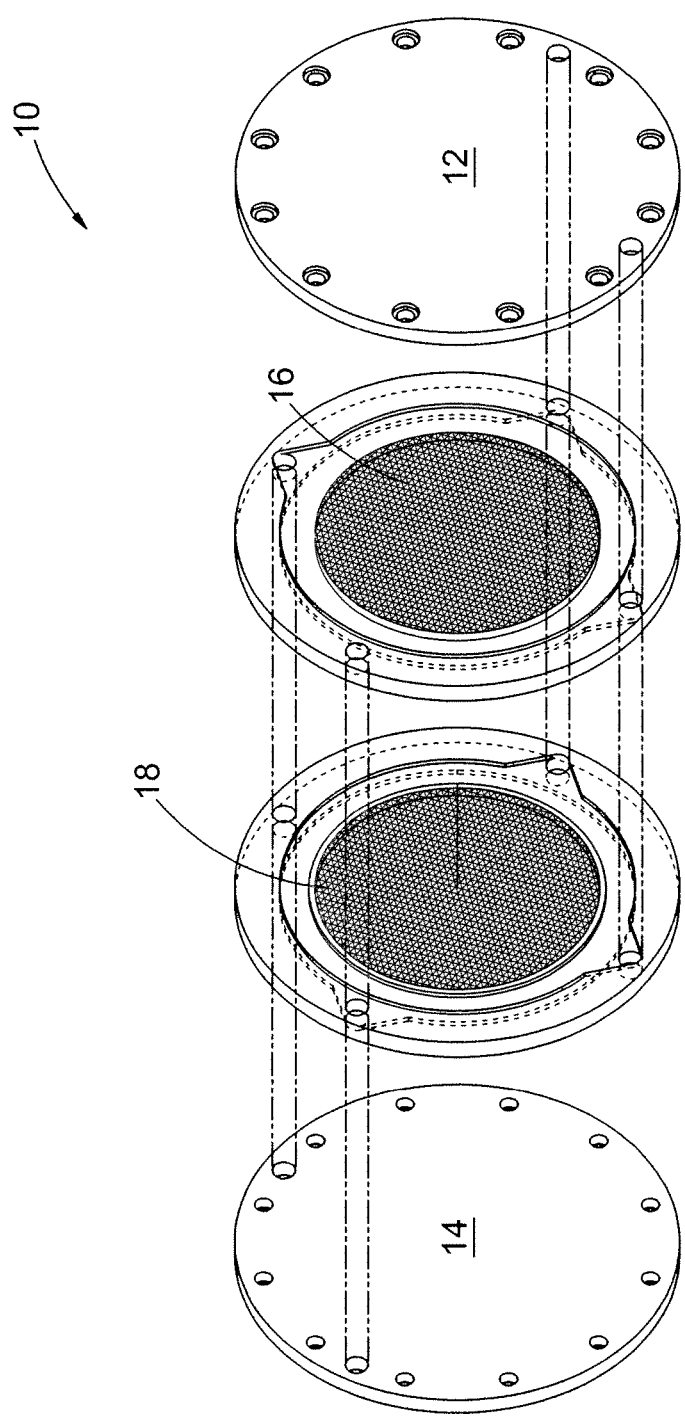
FIG. 2 is an exploded perspective view of part of an electrolysis apparatus according to a second preferred embodiment of the invention.
Figure 3:
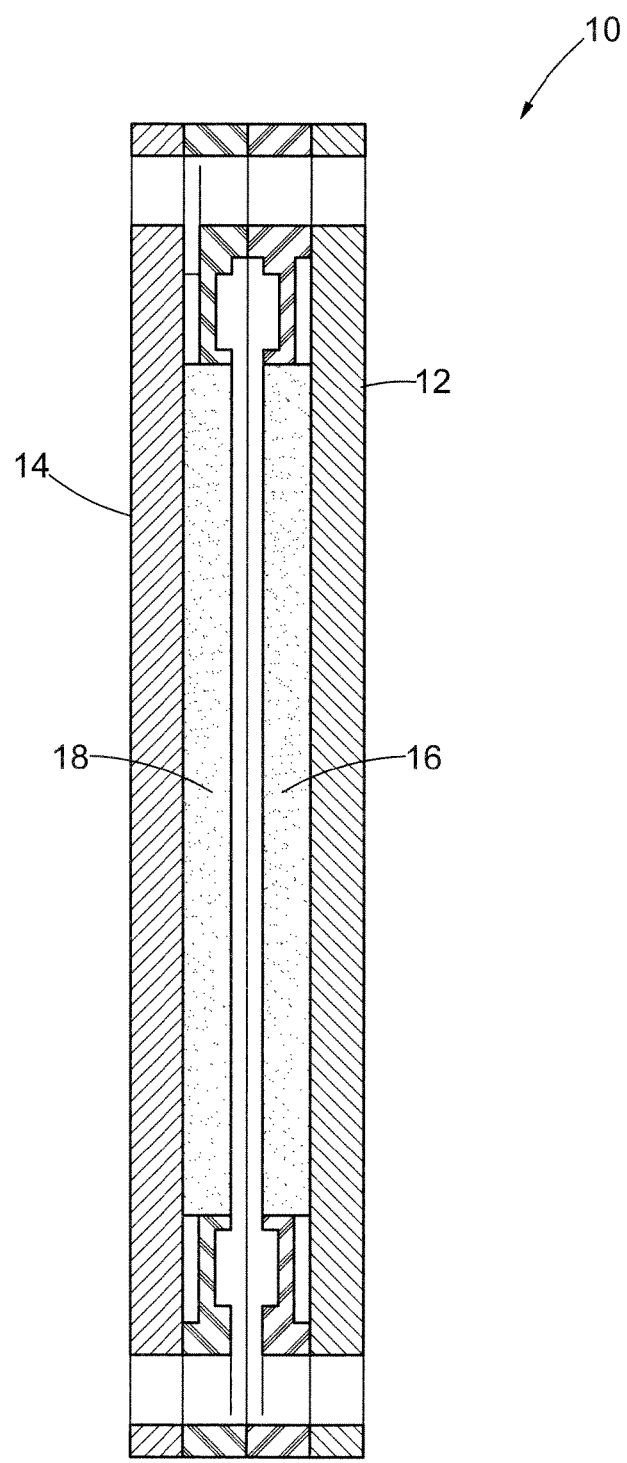
FIG. 3 is a cross sectional view of a single electrode of the apparatus of FIG. 2.

Referring to FIG. 1, the first and second outer end members 12 and 14 are both square shaped and are arranged generally parallel to one another and are spaced from one another. It is foreseen that the apparatus could be multi-agonal or circular in shape and not necessarily be square, such as is shown in FIG. 2.

The apparatus 10 further includes two spaced apart permeable electrodes, a first permeable electrode 16 and a second permeable electrode 18. The permeable electrode 16 and 18 are each of a foraminous or perforated material. Specifically the permeable electrodes are each of stainless steel 316 mesh (such as Dutch weave wire mesh). The two permeable electrodes 16 and 18 are also arranged generally parallel to one another, are relatively closely spaced from one another, in the range of between 1 mm and 6 mm. An inlet chamber 20 surrounds the first and second permeable electrodes 16 and 18.

The closer the permeable electrodes 16 and 18 are spaced to each other, results in a lower resistance between them, which means less voltage needs to be applied to the apparatus 10, which results in a more efficient apparatus 10.

Referring to FIG. 1, in a first embodiment of the invention, the two permeable membranes are spaced apart by 4 mm, with a mesh diameter of 20 mm, a mesh area of 314 $mm^2$ and mesh thickness of 0.8 mm. This combination of dimensions results in a current density of 73 $mNcm^2$, utilising 50% KOH as electrolyte concentration at a temperature of 60° C., with an applied voltage of 1.765 VDC. It is foreseen by the applicant that this figure could significantly improve by using higher electrolyte temperatures and reducing the spacing between the electrodes to below 4 mm.

The electroplating of the electrodes by Platinum will also greatly enhance the catalytic effectiveness of the electrodes.

The first and second electrodes may be attached to stainless steel couplers 24 fixed to the connector tab for distribution of current around the electrodes. A PVC sleeve 22 keeps the electrode firmly attached to the coupler, and electrically isolates the coupler from the electrolyte.

The inlet chamber 20 has two inlets 26 for allowing electrolytic solution to pass into said chamber 20. The apparatus 10 also has an oxygen outlet 28 as well as a hydrogen outlet 30.

The flow of electrolytic solution through the permeable electrodes 16 and 18 will carry with it the oxygen and hydrogen gasses generated on the positive and negative (first and second) permeable electrodes respectively. There is thus a natural separation of the hydrogen and oxygen gasses. The close proximity of the electrodes 16 and 18 also permits hydrolyzing at very low voltage, permitting high efficiency and high purity hydrogen and oxygen.

The first and second permeable electrodes 16 and 18 form a set of permeable electrodes. The apparatus 10 could include a plurality of sets of permeable electrodes arranged and connected to one another in a back-to-front or parallel arrangement.

The first and second electrodes 16 and 18 include conductive connector tabs or plates (one being the positive terminal and the other being the negative terminal) for connecting to a power supply (not shown), such as a battery. The powers supply thus supplies a voltage of between 1 V and 6 V, over the electrolysing apparatus 10 to electrolyse the solution. The present apparatus 10 produces hydrogen and oxygen by applying either a pure DC voltage or pulsed DC voltage to the apparatus.

The apparatus 10 further includes a circulating means, such as a pump (not shown) to circulate the solution through the apparatus 10. The electrolytic solution flowing into the chamber 20 via the inlets 26 is pressurised by being pumped into the apparatus 10 by the pump, so that the solution is forced through the permeable electrodes 16 and 18. The arrangement is such that electrolytic solution flows into the first chamber 20 via the inlets 26, through the permeable electrodes 16 and 18. Electrolytic action takes place between the first and second permeable electrodes 16 and 18 respectively. The oxygenated fluid passes out via the oxygen outlet 28 and the hydrogenated fluid passes out via the hydrogen outlet 30.

The apparatus 10 could further include a hydrogen collection container (not shown) connected to the hydrogen outlet 30 and an oxygen collection container (also not shown) connected to the oxygen outlet 28. The oxygen and hydrogen collection containers each have a second electrolytic solution outlet located towards the operatively bottom end of the containers and oxygen and hydrogen gas outlets located towards the operatively top end of each of the oxygen and hydrogen collection containers, respectively. Electrolytic solution passes out of the oxygen and hydrogen outlets 28 and 30, together with the respective gasses, into the oxygen and hydrogen collection containers. The arrangement is such that hydrogen and oxygen gases within the fluids passing into the respective containers are released through gravity and surface tension, and passed out of the containers via the oxygen and hydrogen gas outlets and the electrolytic solution passes out of the containers via the second electrolytic solution outlets. The second electrolytic solution outlets are connected to the inlets 26 and the solution is circulated back to the apparatus 10 by means of the pump. The gasses are thus stored for later use.

It is foreseen that there is a positive flow from the first chamber 20 to the oxygen and hydrogen outlets 28 and 30 of the apparatus 10. The pressurised flow of the electrolytic solution from the first chamber 20 to the oxygen and hydrogen outlets 28 and 30, through the permeable electrodes, restricts oxygen gas and hydrogen gas, after formation on the first and second permeable electrodes 16 and 18, from entering the first chamber 20. It is foreseen that ionic flow in the apparatus occurs against and with the flow of electrolyte, being a unique feature of the current setup.

It is further foreseen that the electrolysis apparatus essentially does not have a membrane, as in the case of prior art apparatus and that gas bubbles forming on the electrodes are immediately removed with the flow of electrolyte. This has a number of advantages, for example, the cost of both a wet or dry membrane is removed, along with the cost of maintaining the membranes. Further, current density conventionally drops as gas bubbles form on the electrodes, however, in the current setup, the gas bubbles are immediately removed so as to maintain a constant current density. It is hugely significant that with a current density of 11,000 mA/cm, the gas bubbles were still kept separated.

The fact that there is no membrane present, also removes the pressure and temperature limitations that are usually present with the use of membranes. In the present invention, permeable electrodes are used, which do not allow for shaded conduction areas to be created by the movement of gasses across the electrode surface. This increases the effective conduction area of the electrode, reduces the effective voltage requirement and thereby improves efficiency resulting in a reduction in operating costs.

It is also further foreseen that with a reduction of the spacing between electrodes, a higher current density and increased efficiency can be achieved.

It will be appreciated that variations in detail are possible with a method and apparatus for producing hydrogen and oxygen gasses according to the invention without departing from the scope of the appended claims.

The invention claimed is:

1. A method for producing oxygen and hydrogen gas from a liquid alkaline electrolytic solution during a process of electrolysis comprising:

provided an electrolysing apparatus having first and second spaced apart and parallel foraminous electrodes, immersed in an inlet chamber, which surrounds the first and second electrodes and which has at least one inlet and two outlets;

passing an electrolytic solution into the inlet so as to immerse the electrodes in the electrolytic solution; and applying a voltage to the apparatus across the electrodes which are immersed in the electrolytic solution to electrolyze the solution between the electrodes so that oxygen gas forms on the first electrode and hydrogen gas forms on the second electrode, wherein the electrolytic solution between the electrodes diverges into first and second outlet streams such that the first outlet stream passes through the first electrode thereby removing the oxygen gas from the first electrode as the first outlet stream passes into the first outlet, and such that the second outlet stream passes through the second electrode thereby removing the hydrogen gas from the second electrode as the second outlet stream passes into the second outlet;

wherein the first and second electrodes are provided in relative close proximity to one another in a range of between 1 mm and 6 mm.

2. A method according to claim 1 wherein the electrolytic solution is potassium hydroxide (KOH) or sodium hydroxide (NaOH).

3. A method according to claim 1 wherein each permeable electrode comprises a mesh or foam material.

4. A method according to claim 1 wherein each permeable electrode comprises a material selected from the group consisting of stainless steel, nickel, palladium, cobalt and platinum material.

5. A method according to claim 1 wherein the first and second permeable electrodes have a predetermined ratio of open to closed area which is influenced by the size of the outlets and the pressure with which the solution is provided to the apparatus.

6. A method according to claim 1 wherein the first and second permeable electrodes comprise a set of permeable electrodes and the apparatus comprises a plurality of sets of permeable electrodes of similar configuration.

7. A method according to claim 6 wherein there are a plurality of said electrolysing apparatus and an inlet manifold in fluid flow communication with all of the inlets of the plurality and the method comprises introducing the solution to the chambers of all of the sets of permeable electrodes via the inlet manifold.

8. A method according to claim 7 wherein a first combustible fluid outlet passage is in fluid flow communication with all of the first combustible fluid outlets of all of the sets of permeable electrodes and a second combustible fluid outlet passage is in fluid flow communication with all of the second combustible fluid outlets of all of the sets of permeable electrodes, arranged such that the first combustible fluid formed on the first electrode exits the apparatus via the first combustible fluid outlet and the second combustible fluid formed on the second electrode exits the apparatus via the second combustible fluid outlet.

9. An electrolysing apparatus in which oxygen and hydrogen gas are produced from an electrolytic solution, namely potassium hydroxide (KOH) or sodium hydroxide (NaOH), in a process of liquid alkaline electrolysis comprising:

first and second spaced apart and parallel foraminous electrodes provided in relative close proximity to one another in a range of between 1 mm and 6 mm and immersed in an inlet chamber which surrounds the first and second electrodes; and at least one inlet into the inlet chamber for passing the electrolytic solution into said inlet chamber where electrolysis takes place upon the application of a voltage across the electrodes, so that oxygen forms on the first electrode and hydrogen forms on the second electrode, the apparatus being configured such that the electrolytic solution diverges into first and second outlet streams between the electrodes such that the first outlet stream passes through the first electrode thereby removing oxygen from the first electrode as the first outlet stream passes into a first combustible fluid outlet, and such that the second outlet stream passes through the second electrode thereby removing the hydrogen from the second electrode as the second outlet stream passes into a second combustible fluid outlet.

10. An electrolysing apparatus according to claim 9 wherein the electrolyte is potassium hydroxide (KOH) or sodium hydroxide (NaOH) at concentrations ranging from 20% to 50%.

11. An electrolysing apparatus according to claim 10 wherein each foraminous electrode is a mesh or foam material.

12. An electrolysing apparatus according to claim 11 wherein each permeable electrode is made of a material selected from the group consisting of stainless steel, nickel, palladium, cobalt and platinum material.

13. An electrolysing apparatus according to claim 9 wherein the first and second electrodes each include at least one connector tab for connecting to a power supply to supply a voltage over the electrolysing apparatus to electrolyse the electrolytic solution.

14. An electrolysing apparatus according to claim 13 wherein the first and second electrodes are attached to stainless steel couplers, fixed to the connector tab for distribution of current around the electrodes.

15. An electrolysing apparatus according to claim 14 wherein a PVC sleeve is disposed to keep each of the electrodes firmly attached to the coupler, and electrically isolate the coupler from the electrolyte.

16. An electrolysing apparatus according to claim 9 wherein the first and second permeable electrodes have a correct and predetermined ratio of open to close area which is influenced by the size of the outlets and the pressure with which the solution is provided to the apparatus.

17. An electrolysing apparatus according to claim 9 having first and second outer polyethylene end members.

18. An electrolysing apparatus according to claim 9 which is cylindrical, square or multi-agonal in shape.

19. An electrolysing apparatus according to claim 9 including circulator to circulate the solution through the apparatus and to force the solution into the inlet chamber.

20. An electrolysing apparatus according to claim 9 including a first combustible fluid collection container connected to the first combustible fluid outlet and a second combustible fluid collection container connected to the second combustible fluid outlet.

* * * * *